US012692037B2

(12) United States Patent
Lewis-Mizlo

(10) Patent No.: US 12,692,037 B2
(45) Date of Patent: Jul. 28, 2026

(54) BLISTER PACK TOOL

(71) Applicant: Grayson Lewis-Mizlo, Cullowhee, NC (US)

(72) Inventor: Grayson Lewis-Mizlo, Cullowhee, NC (US)

( * ) Notice: Subject to any disclaimer, the term of this patent is extended or adjusted under 35 U.S.C. 154(b) by 543 days.

(21) Appl. No.: 18/186,456

(22) Filed: Mar. 20, 2023

(65) Prior Publication Data

US 2023/0294866 A1 Sep. 21, 2023

Related U.S. Application Data

(60) Provisional application No. 63/321,724, filed on Mar. 20, 2022.

(51) Int. Cl.
*B65B 69/00* (2006.01)
*B67B 7/00* (2006.01)
*B67B 7/86* (2006.01)

(52) U.S. Cl.
CPC ............ *B65B 69/0041* (2013.01); *B67B 7/26* (2013.01); *B67B 7/28* (2013.01)

(58) Field of Classification Search
CPC .... B67B 7/00; B67B 7/20; B67B 7/28; B67B 7/26; B67B 7/24; A47G 21/04
USPC ....... 30/124, 113.1, 141, 147, 149, 150, 324
See application file for complete search history.

(56) References Cited

U.S. PATENT DOCUMENTS 1,984,081 A * 12/1934 Pisculli .................. A47G 21/04 30/324
2,249,551 A * 7/1941 Zohe ..................... A61J 7/0023 D7/653
2,320,994 A * 6/1943 Wright ................... A47G 21/02 D7/653
4,839,965 A * 6/1989 Levie .................... A47J 43/285 30/324
D412,813 S * 8/1999 Roskind ......................... D7/653
6,453,562 B1 * 9/2002 Hakim ................... B21D 53/62 30/326
2001/0045016 A1 * 11/2001 O'Brien .................. A47J 17/04 30/147
2013/0047445 A1 * 2/2013 Zheng .................... A47G 21/04 30/324
2016/0249756 A1 * 9/2016 Kramer .................. A47G 21/04 30/324

* cited by examiner

*Primary Examiner* — Phong H Nguyen
(74) *Attorney, Agent, or Firm* — NK Patent Law

(57) ABSTRACT

A blister pack tool for piercing a blister pack and removing a dosage unit from the blister pack. The blister pack tool comprises a handle and a head. The head of the blister pack tool includes a bowl section for holding a removed dosage unit, a guideway for directing the removed dosage unit into the bowl section, and a piercing tip for piercing the blister pack and removing the dosage unit from the blister pack.

16 Claims, 3 Drawing Sheets

BLISTER PACK TOOL

CROSS-REFERENCE TO RELATED APPLICATION

This application claims the benefit of U.S. Provisional Patent Application No. 63/321,724, filed on Mar. 20, 2022, the content of which is herein incorporated by reference in its entirety.

BACKGROUND

Blister packaging is a result of heating a sheet of plastic and molding it into a desired shape to form a pocket that covers a product. Blister packs are used for a variety of medications. A dosage unit is placed within the pocket (e.g., a cavity), or blister, of a plastic form and held in place by attachment of a relatively rigid foil attached to the back of the plastic form. In order to access the dosage unit, a user must push the pill or tablet through the foil or break through the foil from the back side of the package. To discourage small children from easily pushing pills out of the packs, most blister packs containing medication use a fairly resilient foil or a layer of foil and a layer of paper.

Blister packs are often difficult for the average adult to open. Adults with disabilities, poor strength, arthritis, a hand injury, or other hand-related injuries may have even greater difficulty. Medical professionals also may experience frustration with this type of packaging simply due to the number of times each day they are required to remove medicine from such packages.

FIELD OF THE INVENTION

The present invention relates to a manual blister pack tool for opening a blister pack and removing the dosage unit contained within the blister pack.

DESCRIPTION OF RELATED ART

Current tools for opening blister packs include scissors, seam rippers, dental hooks, and letter openers. Other blister pack tools are too complex to use and too cumbersome for easy storage. Some blister pack tools may successfully pierce the foil but allow the dosage unit to escape in an uncontrolled manner and can cut a user. Other blister pack tools can damage the dosage unit in the effort of piercing the foil. Therefore, there is a need for a blister pack tool that may be used in a manner to control both the piercing of the foil and the removal of the dosage unit from the packaging.

BRIEF SUMMARY

The present invention comprises a simple, manual tool for piercing a blister pack and removing the dosage contained therein. Benefits of the described tool include (1) a relatively small size, (2) minimal storage space requirements, (3) designed to fit into a pocket, and (4) zero moving parts. These benefits make the present invention very difficult to damage or use incorrectly. The blister pack tool includes a handle manufactured for easy gripping by a human hand and a head for piercing the blister pack and removing the dosage from the same.

In one embodiment, the present invention includes a blister pack tool for opening blister packaging to receive a dosage contained within the blister packaging. The blister pack tool includes a handle and a head including a guiding section and a bowl section. The handle is connected to the head. The handle includes a first end and a second end. The handle is designed to taper from the first end to the second end. The second end is connected to the head. The guiding section further includes a piercing tip positioned on a distal end from the bowl section. The piercing tip is connected to the bowl section via a guideway. The bowl section is operable to receive the dosage via the guideway and the bowl section includes a capture area and a bowl wall design to receive the medication.

In another embodiment, the present invention includes a blister pack tool for opening a blister on a blister pack and removing a dosage contained within the blister pack. The blister pack tool includes a handle and a heal. The head includes a bowl section and a guiding section. The bowl section and the guide section are connected. The bowl section is designed to hold the dosage removed from the blister pack. The guiding section includes a guideway and a piercing tip. The guideway has a distal end and a proximal end. The proximal end of the guideway is attached to the bowl section. The piercing tip is positioned at the distal end of the guideway section. The piercing tip is further designed to pierce the blister pack.

In yet another embodiment, the present invention includes a blister pack tool for opening blister packaging to receive a dosage. The blister pack tool includes a handle and a head including a guiding section and a bowl section. The handle is connected to the head. The handle further includes a first end and a second end. The handle is designed to taper from the first end to the second end. The second end of the handle is attached to the head. The guiding section includes a piercing tip positioned on a distal end from the bowl section. The piercing tip is connected to the bowl section via a guideway. The guideway includes a sloped surface. The bowl section is designed to receive the dosage via the guideway. The bowl section includes a capture area to receive the medication.

BRIEF DESCRIPTION OF THE DRAWINGS

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
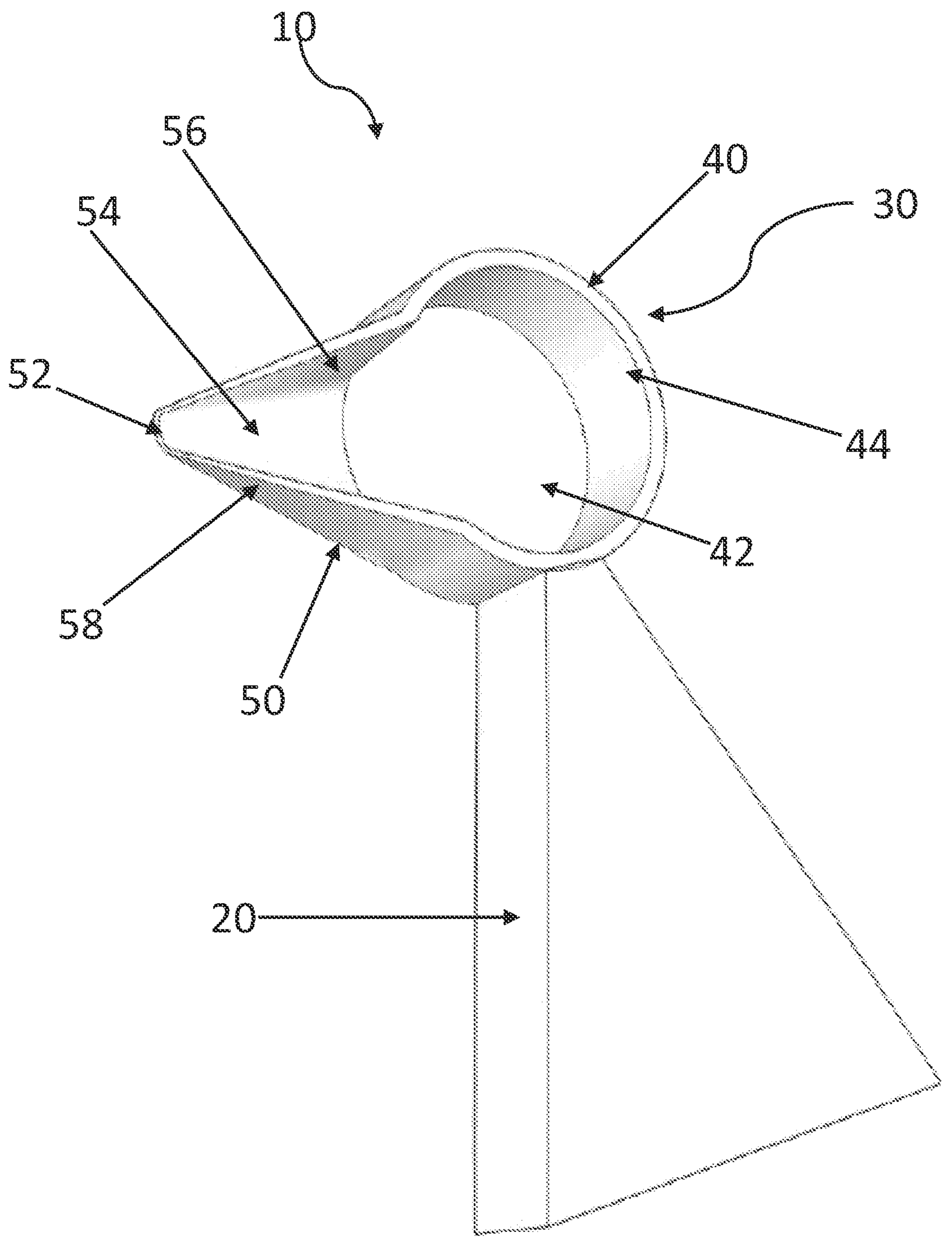
FIG. 1 is a perspective view of an embodiment of the blister pack tool.

For the purpose of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers, or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

In one embodiment, the present invention includes a blister pack tool for opening blister packaging to receive a dosage contained within the blister packaging. The blister pack tool includes a handle and a head including a guiding section and a bowl section. The handle is connected to the head. The handle includes a first end and a second end. The handle is designed to taper from the first end to the second end. The second end is connected to the head. The guiding section further includes a piercing tip positioned on a distal end from the bowl section. The piercing tip is connected to the bowl section via a guideway. The bowl section is operable to receive the dosage via the guideway and the bowl section includes a capture area and a bowl wall design to receive the medication.

In another embodiment, the blister pack tool includes a triangular-shaped handle. In yet another embodiment, the blister pack tool includes a guideway designed to taper from the bowl section to the piercing tip. In one embodiment, the guideway further includes at least one guide wall designed to keep medication in the guideway. In another embodiment, the blister pack tool includes a curved guideway. In yet another embodiment, the blister pack tool includes a spherically shaped bowl section. In one embodiment, the guideway includes a sloped surface such that a removed dosage will slidably move from the piercing tip along the guideway to the bowl section.

In another embodiment, the present invention includes a blister pack tool for opening a blister on a blister pack and removing a dosage contained within the blister pack. The blister pack tool includes a handle and a heal. The head includes a bowl section and a guiding section. The bowl section and the guide section are connected. The bowl section is designed to hold the dosage removed from the blister pack. The guiding section includes a guideway and a piercing tip. The guideway has a distal end and a proximal end. The proximal end of the guideway is attached to the bowl section. The piercing tip is positioned at the distal end of the guideway section. The piercing tip is further designed to pierce the blister pack.

In one embodiment, the blister pack tool further includes a guiding section tapered from the proximal end to the distal end. In another embodiment, the blister pack tool further includes a bowl section including a flat surface and a guide wall, wherein the guide wall surrounds the flat surface, wherein after receiving the dosage, the bowl section is designed for the removed dosage to lay on the flat surface. In yet another embodiment, the blister pack tool includes a bowl section including an exterior and an interior, wherein the interior of the bowl section is spherically shaped. In one embodiment, the blister pack tool further includes a guideway including a sloped surface, wherein the guideway is designed for the removed dosage to slidably move along the guideway from the piercing tip to the bowl section.

In yet another embodiment, the present invention includes a blister pack tool for opening blister packaging to receive a dosage. The blister pack tool includes a handle and a head including a guiding section and a bowl section. The handle is connected to the head. The handle further includes a first end and a second end. The handle is designed to taper from the first end to the second end. The second end of the handle is attached to the head. The guiding section includes a piercing tip positioned on a distal end from the bowl section. The piercing tip is connected to the bowl section via a guideway. The guideway includes a sloped surface. The bowl section is designed to receive the dosage via the guideway. The bowl section includes a capture area to receive the medication.

In one embodiment, the blister pack tool further includes a guiding section that tapers from the proximal end to the distal end. In another embodiment, the blister pack tool further includes a bowl section including a flat surface and a guide wall, wherein the guide wall surrounds the flat surface, wherein, after, receiving the dosage, the bowl section is designed for the dosage to lay on the flat surface. In yet another embodiment, the blister pack tool includes a guideway with a first side and a first guide wall and a second side including a second guide wall, wherein the first guide wall and the second guide wall are designed to align the removed dosage along the guideway to the bowl section. In one embodiment, the bowl section is a cylindrical shape. In another embodiment, the blister pack tool includes a handle with a triangular shape. In yet another embodiment, the blister pack tool includes a sloped surface of the guideway with a curved shape.

Figure 2:
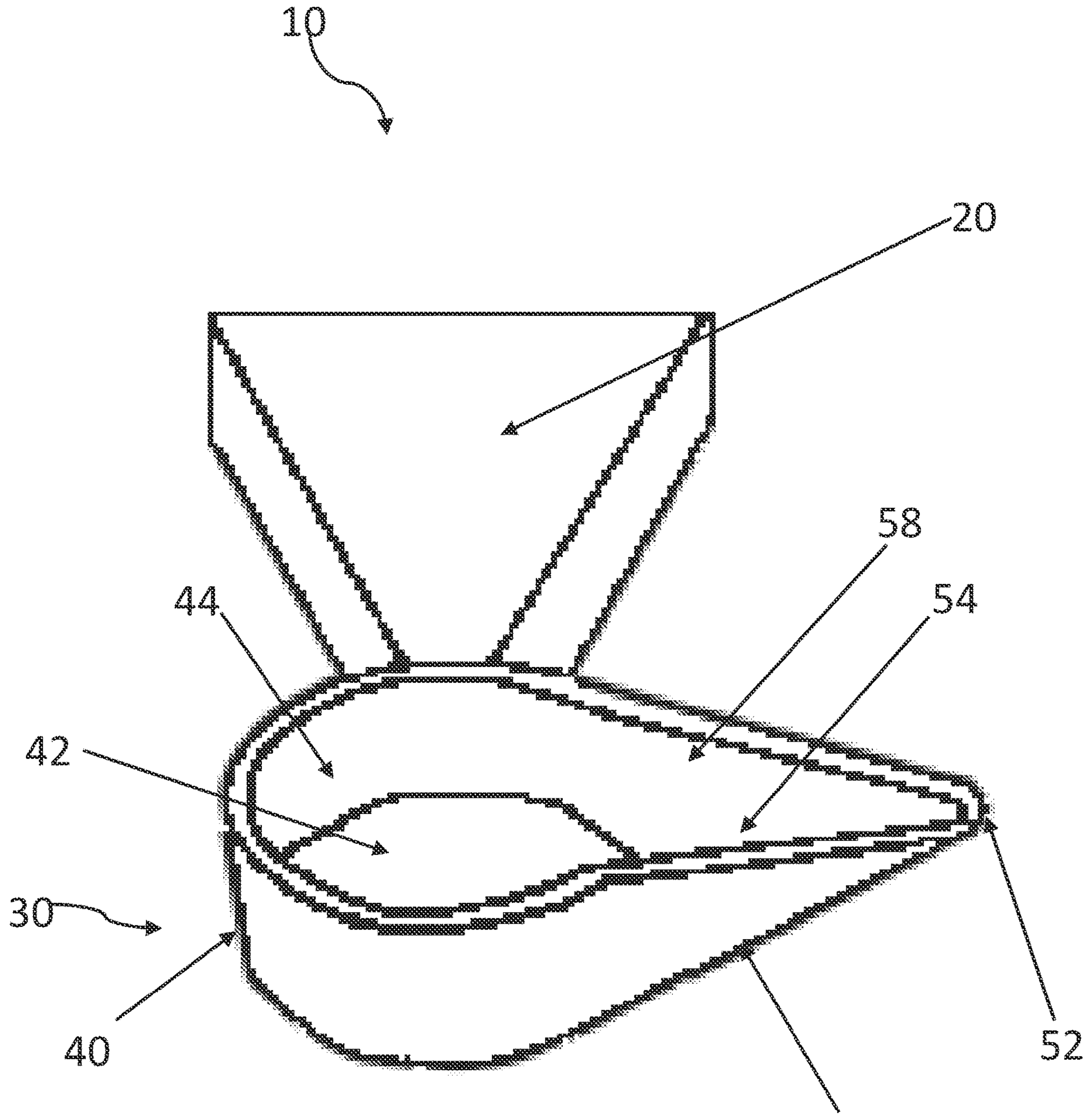
FIG. 2 illustrates a top perspective view of an embodiment of the blister pack tool.
Figure 3:
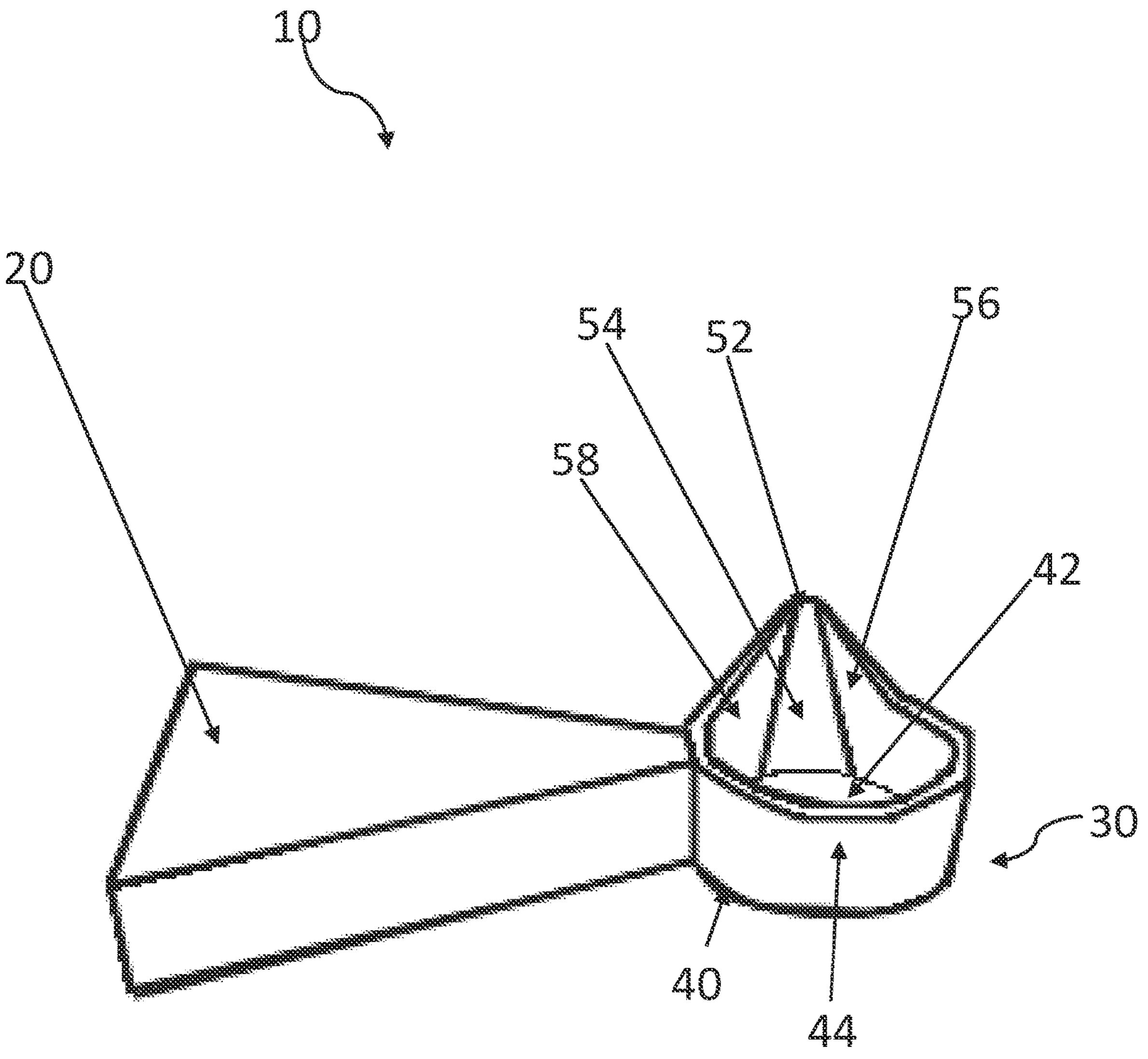
FIG. 3 illustrates a side perspective view of an embodiment of the blister pack tool.

FIG. 1 illustrates a front perspective view of a blister pack tool 10 according to one embodiment of the present invention. FIG. 2 illustrates a top perspective view of an embodiment of the blister pack tool. FIG. 3 illustrates a side perspective view of an embodiment of the blister pack tool. The blister pack tool 10 comprises a handle 20 and a head 30. Advantageously, the handle 20 is designed to be gripped by a human hand. For example, and not limitation, the handle is angled relative to the head of the tool. In another example, the handle is aligned in parallel with the head of the blister pack tool. In yet another example, the handle includes a diameter between about 1.25 inches to about 2 inches. In another example, the handle includes a diameter between about 0.3 inches to about 0.5 inches. In some embodiments, the length of the handle is at least four inches. In one embodiment, the length of the handle is about 5 inches. In another embodiment, the handle includes a textured handle including a non-slip material. In yet another embodiment, the handle further includes a cushion.

As shown in FIG. 1, in one embodiment, the handle 20 is tapered with the narrower end being connected to the head 30. Advantageously, this tapered design allows a user's hand to abut the head 30, thereby, providing for a secure and steady grip such that the user is able to be precise in guiding the movement of the head 30. This is particularly beneficial for individuals with poor grip strength and coordination because the head of the blister pack tool can be directly controlled to align the head with a dosage unit within the blister pack. In another embodiment, the blister pack tool may be cylindrical, spherical, angled (e.g., pistol grip), T-shaped, D-shaped, or O-shaped.

The head 30 of the blister pack tool 10 is designed to both pierce a blister pack (not shown) and remove the dosage (not shown) from within the blister pack. FIG. 1 illustrates a blister pack tool designed for use by the user's right hand while a blister pack is held in the left hand or otherwise secured. In an alternative embodiment, the blister pack tool is designed for use by a user's left hand while a blister pack is held in the right hand. The head 30 includes a guiding section 50 connected to a bowl section 40 for capturing the dosage once it has been removed from the blister pack.

The guiding section 50 comprises a piercing tip 52 at the end distal from the bowl section 40. The piercing tip 52 includes an edge sharp designed to pierce a blister pack. The sharp edge of the piercing tip is further designed to be sharp enough to pierce a blister pack but to only cause minimal injuries should it come into contact with a user's hand. The piercing tip 52 is sized to effectively scoop a dosage from a blister pack. For example, and not limitation, the piercing tip includes a length of up to about 1 inch and a width of up to about 1 inch.

As further shown in FIG. 1, the piercing tip 52 is connected to the distal end of a guideway 54. The guideway 54 is tapered such that the guideway 54 is narrower at the piercing tip 52 and wider where the guideway 54 meets the bowl section 40. On either side of the guideway 54 are guide walls 56, 58 for assisting in keeping a removed dosage unit on the guideway 54 until the removed dosage reaches the bowl section 40. In certain embodiments, the guiding section 50 may be differently shaped. For example, and not limitation, the guideway 54 may be curved rather than flat as shown.

As shown in FIGS. 1-3, the bowl section 40 comprises a flat capture area 42 surrounded by a bowl wall 44. In some embodiments, the bowl section includes an interior in the shape of a spherical cap and forms a seamless curve.

For example, and not limitation, a method of using the blister pack tool includes (1) grabbing the blister pack tool 10, (2) placing the piercing tip 52 of the guiding section 50 against the surface of a blister pack, (3) pressing the piercing tip 52 until it pierces the surface of the blister pack, (4) positioning the head 30 of the tool 10 so that the piercing tip 52 is against a dosage contained within the blister pack, (5) initiating the use of the piercing tip 52 to guide the dosage along the guideway 54 and into the bowl section 40, and (6) removing the dosage for administration.

As a further example, and not limitation, the blister pack tool 10 is operable to be used to transfer the dosage to another individual for self-administration of the dosage by tipping the head 30 of the blister pack tool 10 so that the removed dosage unit slides from the bowl section 40 and along the guideway 54 into the hand of the receiving individual. Advantageously, the blister pack tool 10 is further operable to transfer the dosage into a medicine cup or pill organizer.

In one embodiment, the present invention includes a blister pack tool manufactured via additive manufacturing (e.g., 3D printing). For example, and not limitation, the blister pack tool is created via material extrusion, vat polymerization, powder bed fusion, material jetting, binder jetting, and/or direct energy deposition. In one embodiment, the blister pack tool is created via material extrusion using fused deposition modeling or fused filament fabrication. In another embodiment, the blister pack tool is manufactured via vat polymerization including, but not limited to, at least one of stereolithography, direct light processing, programmable photopolymerization, masked stereolithography, high area rapid printing, lithography-based metal manufacturing, light-enabled additive production, projection micro stereolithography, and/or digital composite manufacturing. In yet another embodiment, the blister pack tool is created via powder bed fusion including, but not limited to, at least one of selective laser sintering, electron beam melting, direct metal laser sintering, selective laser melting, and/or multi-jet fusion. In one embodiment, the blister pack tool is manufactured via material jetting including, but not limited to, at least one of drop-on-demand printing, nanoparticle jetting, and/or color jet printing. In another embodiment, the blister pack tool is manufactured via at least one of sand binder jetting, plastic jetting, or metal binder jetting. In another embodiment, the blister pack tool is manufactured via direct energy deposition including electron beam additive manufacturing, laser-engineered net shaping, cold spray, direct metal deposition, wire arc additive manufacturing, and/or rapid plasma deposition. In yet another embodiment, the blister pack tool is manufactured via sheet lamination manufacturing including laminated object manufacturing, ultrasonic consolidation, selective lamination composite object manufacturing, plastic sheet lamination, computer-aided manufacturing of laminated engineering materials, selective deposition lamination, or composite-based additive manufacturing.

For example, and not limitation, the blister pack tool is made of at least one of polylactic acid (PLA), acrylonitrile butadiene styrene (ABS), polyethylene terephthalate (PET), polyethylene terephthalate glycol (PET-G), thermoplastic polyurethane (TPU), nylon, acrylonitrile styrene acrylate, high impact polystyrene, photopolymer resin, polymer powder, metal powder, ceramic powder, plastic, and/or other similar materials The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A blister pack tool for opening blister packaging to remove a dosage unit comprising:

a handle; and a head including a guiding section and a bowl section;

wherein the handle is connected to the head;

wherein the handle includes a first end and a second end, wherein the handle is designed to taper from the first end to the second end, wherein the second end is connected to the head;

wherein the guiding section includes a distal end and a proximal end, wherein the guiding section further includes a piercing tip positioned on the distal end;

wherein the handle extends along a first longitudinal axis, wherein the guiding section extends along a second longitudinal axis, wherein the first longitudinal axis is substantially perpendicular to the second longitudinal axis;

wherein the bowl section includes a capture area and a bowl wall;

wherein the piercing tip is connected to the bowl section via a guideway, wherein the piercing tip is configured to pierce a blister pack, wherein, once the blister pack is pierced, the guiding section is configured to capture and remove a dosage unit from the blister pack; and wherein the bowl section is operable to receive the removed dosage unit via the guideway; and wherein the capture area includes a bottom surface and a guide wall, wherein the bottom surface is entirely flat, wherein the guide wall surrounds the flat bottom surface, wherein the guide wall extends upward from an edge of the flat bottom surface, wherein, after receiving the removed dosage unit, the bowl section is designed for the removed dosage unit to lay on the flat bottom surface.

2. The blister pack tool of claim 1, wherein the handle is a triangular shape.

3. The blister pack tool of claim 1, wherein the guideway tapers from the bowl section to the piercing tip.

4. The blister pack tool of claim 1, wherein the guideway further includes at least one guide wall, wherein the at least one guide wall is designed to keep the removed dosage unit in the guideway.

5. The blister pack tool of claim 1, wherein the guideway is a curved shape.

6. The blister pack tool of claim 1, wherein the bowl section is a spherical shape.

7. The blister pack tool of claim 1, wherein the guideway includes a sloped surface, wherein the guideway is designed for the removed dosage unit to slidably move from the piercing tip to the bowl section via the guideway.

8. A blister pack tool for opening a blister on a blister pack and removing a dosage contained within the blister pack, wherein the blister pack tool comprises:

a handle; and a head;

wherein the head comprises a bowl section and a guiding section, wherein the bowl section is connected to the guiding section;

wherein the handle extends along a first longitudinal axis, wherein the guiding section extends along a second longitudinal axis, wherein the first longitudinal axis is substantially perpendicular to the second longitudinal axis;

wherein the guiding section comprises a guideway and a piercing tip;

wherein the guideway has a distal end and a proximal end, wherein the proximal end is attached to the bowl section;

wherein the piercing tip is positioned at the distal end of the guideway, wherein the piercing tip is operable to pierce the blister pack, wherein, once the blister pack is pierced, the guiding section is configured for capture and removal of a dosage unit from the blister pack; and wherein the bowl section receives the removed dosage unit via the guideway, wherein the proximal end of the guideway defines an open section of the bowl section, wherein the bowl section further comprises a bottom surface and a guide wall, wherein the bottom surface is entirely flat, wherein the guide wall surrounds the flat bottom surface, wherein the guide wall extends upward from an edge of the flat bottom surface, wherein the guide wall is connected to the open section of the bowl section, wherein the bowl section is designed to hold the removed dosage unit from the blister pack, wherein, after receiving the removed dosage unit, the guide wall is designed to position the removed dosage unit on the flat bottom surface.

9. The blister pack tool of claim 8, wherein the guiding section is tapered from the proximal end to the distal end, wherein the distal end is narrower than the proximal end.

10. The blister pack tool of claim 8, wherein the guideway includes a sloped surface, wherein the guideway is designed for the removed dosage unit to slidably move along the guideway from the piercing tip to the bowl section.

11. A blister pack tool for opening blister packaging to remove a dosage unit comprising:

a triangular-shaped handle; and a head including a guiding section and a bowl section;

wherein the triangular-shaped handle is connected to an exterior surface of the bowl section of the head, wherein the exterior surface runs around a perimeter of the bowl section;

wherein the triangular-shaped handle includes a first end and a second end, wherein the triangular-shaped handle is designed to taper from the first end to the second end, wherein the second end is connected to the head, wherein the triangular-shaped handle extends along a first longitudinal axis, wherein the guiding section extends along a second longitudinal axis, wherein the first longitudinal axis is substantially perpendicular to the second longitudinal axis;

wherein the guiding section includes a proximal end and distal end, wherein the proximal end is connected to the bowl section, wherein the guiding section further includes a piercing tip positioned on the distal end;

wherein the piercing tip is connected to the bowl section via a guideway;

wherein the guideway includes a sloped surface;

wherein the bowl section is operable to receive a removed dosage unit via the guideway; and wherein the bowl section includes a capture area to receive the removed dosage unit; wherein the capture area includes a bottom surface and a guide wall, wherein the bottom surface is entirely flat, wherein the guide wall surrounds the flat bottom surface, wherein the guide wall extends upward from an edge of the flat bottom surface, wherein, after receiving the removed dosage unit, the bowl section is designed for the removed dosage unit to lay on the flat bottom surface.

12. The blister pack tool of claim 11, wherein the guiding section is tapered from the proximal end to the distal end, wherein the distal end is narrower than the proximal end.

13. The blister pack tool of claim 11, wherein the guideway further includes a first side including a first guide wall and a second side including a second guide wall, wherein the first guide wall and the second guide wall are designed to align the removed dosage unit along the guideway to the bowl section.

14. The blister pack tool of claim 11, wherein the bowl section is a cylindrical shape.

15. The blister pack tool of claim 11, wherein the sloped surface of guideway includes a curved shape.

16. The blister pack tool of claim 11, wherein the triangular-shaped handle further includes a cushion.

* * * * *